United States Patent [19]

Doorbar

[11] Patent Number: 5,041,314

[45] Date of Patent: Aug. 20, 1991

[54] RELATING TO FILAMENT COATING

[75] Inventor: Phillip J. Doorbar, Derby, England

[73] Assignee: Rolls-Royce plc, London, England

[21] Appl. No.: 480,615

[22] Filed: Feb. 15, 1990

[30] Foreign Application Priority Data

Mar. 14, 1989 [GB] United Kingdom ............... 8905814

[51] Int. Cl.⁵ ............................................. B05D 1/18
[52] U.S. Cl. ................................ 427/432; 427/434.6; 427/443.2; 164/461
[58] Field of Search ...................... 427/432, 423, 434.6, 427/443.2; 164/461; 118/DIG. 19, DIG. 21, DIG. 22, 78, 202, 420

[56] References Cited

U.S. PATENT DOCUMENTS

| | | | |
|---|---|---|---|
| 1,654,509 | 12/1927 | Claus | 427/432 |
| 3,451,847 | 6/1969 | Ashpole et al. | 117/231 |
| 3,776,297 | 12/1973 | Williford et al. | 164/4 |
| 4,172,162 | 10/1979 | Danzey, Jr. | 427/225 |
| 4,782,884 | 11/1988 | Siemers | 164/46 |

FOREIGN PATENT DOCUMENTS 73438 6/1968 Fed. Rep. of Germany ...... 427/432

Primary Examiner—Shrive Beck
Assistant Examiner—Benjamin L. Utech
Attorney, Agent, or Firm—Cushman, Darby & Cushman

[57] ABSTRACT

Known methods of melting Titanium and its alloys for the purpose of sheathing a ceramic filament include the premelting of the metal in a crucible. This method results in contamination of the metal. The present invention obviates the crucible and instead positions a rod of solid Titanium or an alloy thereof adjacent the filament and locally heats the end of the rod. The melt continuously coats the filament which is then traversed laterally of the rod. The method is employed in an inert atmosphere and contamination is thus avoided. In a preferred embodiment, a computer controls the rate of melting of the rod, the movement of the rod, and the lateral movement of the filament.

11 Claims, 1 Drawing Sheet

U.S. Patent  Aug. 20, 1991  5,041,314
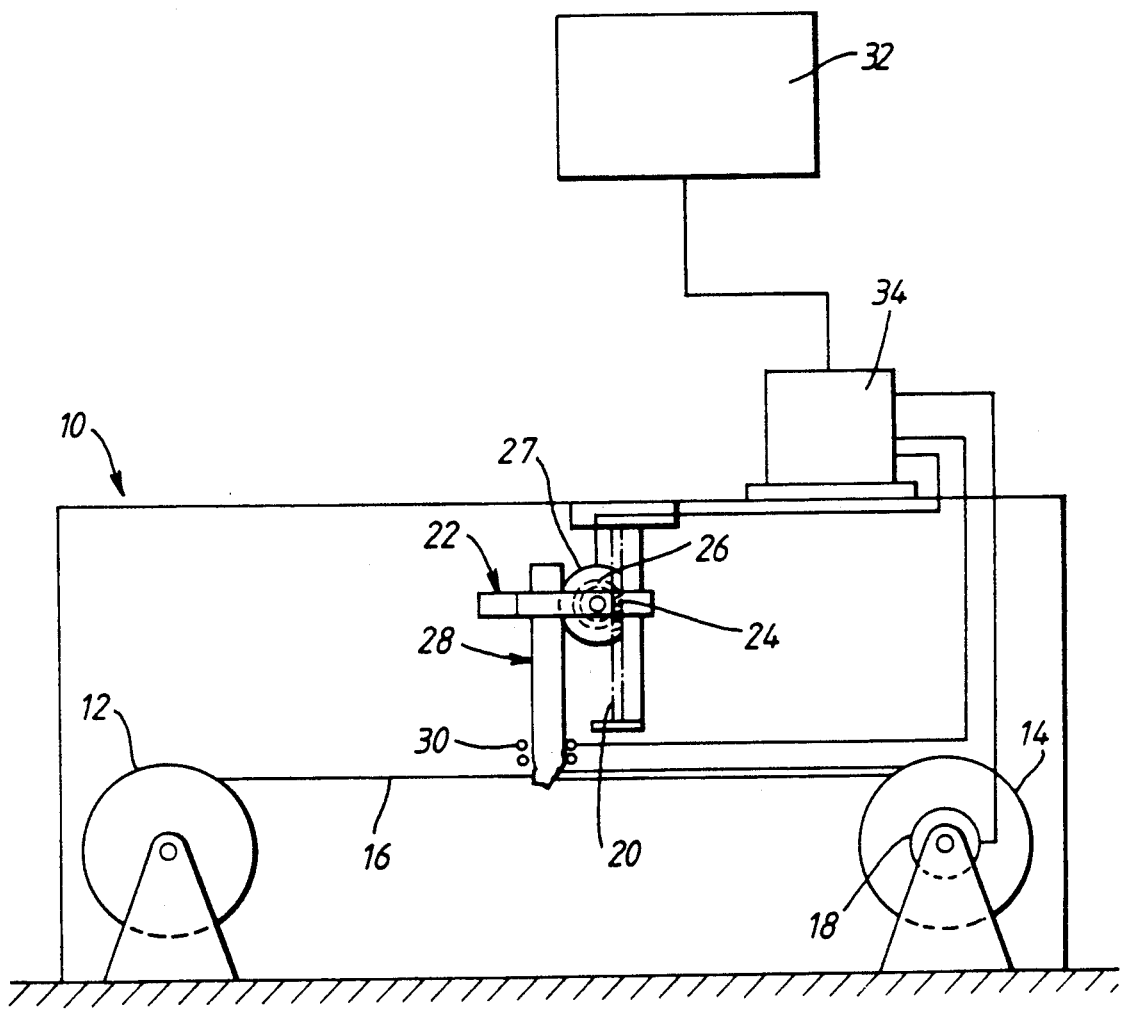

RELATING TO FILAMENT COATING

This invention relates to a method of making a composite material from which a composite structure can be formed.

Endeavors are being made worldwide, to replace metal structures with metal/ceramic composite structures. This is particularly the case in the gas turbine aeroengine industry, sot hat at least equally strong but much lighter weight engines may be built.

Titanium and alloys thereof are examples of strong, lightweight metals and are used in the construction of casings and compressor aerofoils i.e. blades and stators. Ways and means have been examined to reduce further the weight and at the same time at least to maintain the strength of articles normally made from metals such as Titanium or its alloys.

Ceramics such as Silicon Carbide have been found to give the required properties when sheathed in Titanium.

Titanium ad its alloys, along with other lightweight metals such as magnesium, have a drawback however in that they are highly reactive on contacting other materials when at their melting temperature. This is particularly so if the contact is over a time period exceeding more than several seconds.

When Titanium has been melted in a pouring pot, the reaction of the Titanium with the material of the pot has been observed, even where the pot material is ceramic, and contamination has resulted.

Efforts have been made to reduce the contamination of the Titanium to be poured, for example, by lining the pot with Titanium and maintaining the lining in a solid state by local cooling. The Titanium melt thus only contacts a material with which it shares a common identity.

SUMMARY OF THE INVENTION

The present invention, however, seeks to provide an improved method of applying Titanium or other reactive metal to a ceramic filament.

According to the present invention, a method of applying a sheath of reactive metal to a ceramic filament comprises the steps of movably supporting a rod of said reactive metal above and with one end adjacent the ceramic filament, arranging heating means around said adjacent rod end in spaced relationship therewith, melting said rod end and on said melted end extending downwards and enveloping the adjacent portion of the filament, simultaneously causing the filament to move through the melt in a direction laterally of the rod and moving the rod towards the filament at a rate corresponding to the rate of transfer to the filament, all of said steps being effected in an inert atmosphere.

BRIEF DESCRIPTION OF THE DRAWING

The invention will now be described by way of example and with reference to the drawing which is a diagrammatic illustration of apparatus with which the method is effected.

DETAILED DESCRIPTION OF THE INVENTION

Referring to the drawing, a container 10 has an inert atmosphere within it. The atmosphere may be inert by way of being a vacuum or preferably, it may consist of one of the noble gases e.g. argon.

A pair of drums 12 and 14 are positioned one at each end of the container. The drum 12 is a magazine of Silicon Carbide in filament form and is rotatable. The drum 14 has an end of the filament, identified by the numeral 16, fastened to it and is rotated by a co-axially mounted motor 18.

A rack 20 is fastened to the roof of the container 10 and projects downwardly, towards the central portion of the filament 16. The rack 20 carries a saddle 22 in both sliding and driving manner, i.e. the track is trapped between a 'U' shaped strap 24 and a sprocket wheel 26 which in turn is supported for rotation by a motor 27, between the legs of the strap 24.

The other end of the legs of the strap 24 are adapted so as to enable clamping of a rod of Titanium 28 therebetween, in an attitude which is parallel with the rack 20.

A heating coil 30 surrounds the end of the Titanium rod 28 which initially is positioned close to and above the filament 16.

Operation of the apparatus described in connection with the present invention is as follows.

The speeds at which the filament 16 and Titanium rod 28 must be moved in order that a constant volume of melted Titanium is deposited on the filament are first assessed. An appropriate computer program is then devised and utilized to operate a computer 32. The computer 32 is connected to a control box 34 which in turn is connected to the motor 27 which drives the sprocket wheel 26, to the motor 18 which drives the drum 14, and to the heating coil 30.

In operation, the computer 32 instructs the control box 34 to activate the heating coil 30. The control box then senses the heat achieved by the coil 30 and on sensing that heat which achieves melting of the Titanium, the control box informs the computer 32 which then instructs the control box 34 to activate the motors 27 and 18.

During the operation, the control box 34 constantly monitors the temperature of the heating coil 32 and the speed of movement of the Titanium 28 and the filament 16. If any of the respective values is incorrect, the control box senses this and informs the computer 32 by way of appropriately generated signals, whereupon the computer 32 instructs the appropriate steps that the control box should take to correct that value.

The control box 34 may be provided with a timing device which, when a pre-selected time has expired after initiation of the process, switches off the power to the device. The time will be related to the maximum length of filament 16 which may be unwound, without emptying the drum 12.

The Titanium may be stored in wire form on a further drum (not shown) thus obviating the rack 20. This may only be the case where the diameter of the wire is sufficiently small as to allow winding and yet sufficiently large as to provide sufficient melting to sheath the filament. If those criteria are met, then such a drum may also be motor driven under the control of the control box 34.

Titanium alloys are also suitable for sheathing ceramic filaments as described hereinbefore.

I claim:

1. A method of applying a reactive metal or a reactive metal alloy sheath to a ceramic filament, comprising the steps of: movably supporting a rod of Titanium or Titanium alloy above; with one end of the rod adjacent the ceramic filament, surrounding said one end of the rod with a heating means for locally heating and melting said one end so that said melted end extends downwards and envelops an adjacent portion of the filament, said rod being free of contact with said surrounding heating means; and simultaneously causing the filament to move through the melting rod in a direction laterally of the rod, and moving the rod towards the filament at a rate corresponding to the rate of transfer of metal to the filament, all of said steps being effected in an inert atmosphere.

2. The method of applying a reactive metal or reactive metal alloy sheath to a ceramic filament as claimed in claim 1, wherein the step of supporting the rod involves supporting the rod in a saddle which engages a rack and is driven therealong via a sprocket wheel.

3. The method for applying a reactive metal or reactive metal alloy sheath to a ceramic filament as claimed in claim 1, further comprising the step of producing the rod in wire form, and wherein the step of supporting involves supporting said wire on a rotatable drum.

4. A method of applying a reactive metal or reactive metal alloy sheath to a ceramic filament as claimed in any of claims 1, 2 or 3, further including the step of effecting the method in a vacuum.

5. A method of applying a reactive metal or reactive metal alloy sheath to a ceramic filament as claimed in any of claims 1, 2 or 3, further including the step of effecting the method in an atmosphere comprising an inert gas.

6. The method of applying a reactive metal or reactive metal alloy sheath to a ceramic filament as claimed in claim 5, wherein said inert gas is Argon gas.

7. A method of applying a reactive metal or reactive metal alloy sheath to a ceramic filament, comprising the steps of: movably supporting a rod of Titanium or Titanium alloy above; with one end of the rod adjacent the ceramic filament, surrounding said one end of the rod with a heating means for locally heating and melting said one end so that said melted end extends downwards and envelops an adjacent portion of the filament, said rod being free of contact with said surrounding heating means; and simultaneously causing the filament to move through the melting rod in a direction laterally of the rod, and moving the rod towards the filament at a rate corresponding to the rate of transfer of metal to the filament, all of said steps being effected in an inert atmosphere and under the control of a computer.

8. The method of claim 7 wherein the computer monitors a local temperature of the heating means, downward movement of the rod, and lateral movement of the filament.

9. The method of claim 8 wherein the computer outputs a signal to control the downward movement of the rod.

10. The method of claim 9 wherein the computer outputs a signal to control the lateral movement of the filament.

11. The method of claim 9 wherein the computer outputs a signal to control the local temperature of the heating means.

* * * * *